C. C. & R. C. POUCHER.
PLANT REPLANTER.
APPLICATION FILED MAY 31, 1913.
1,106,405.
Patented Aug. 11, 1914.
8 SHEETS—SHEET 2.
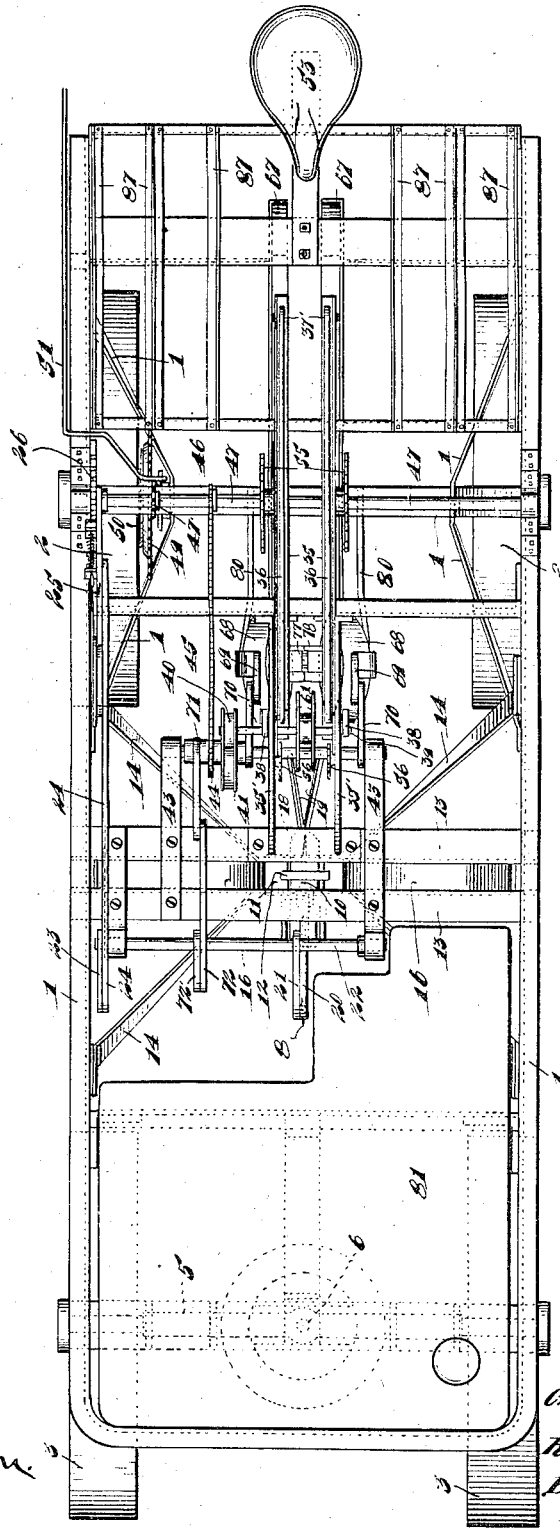

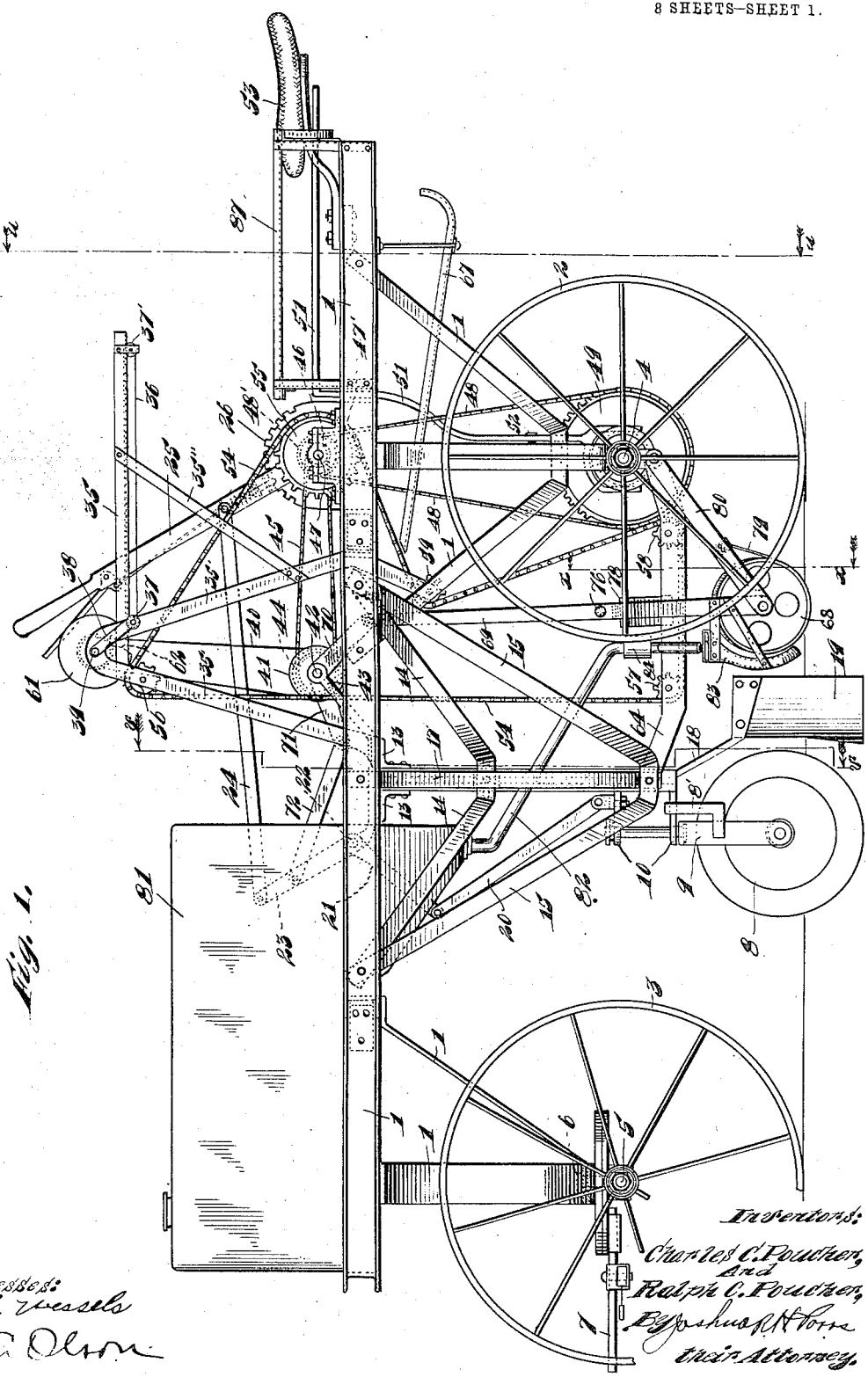

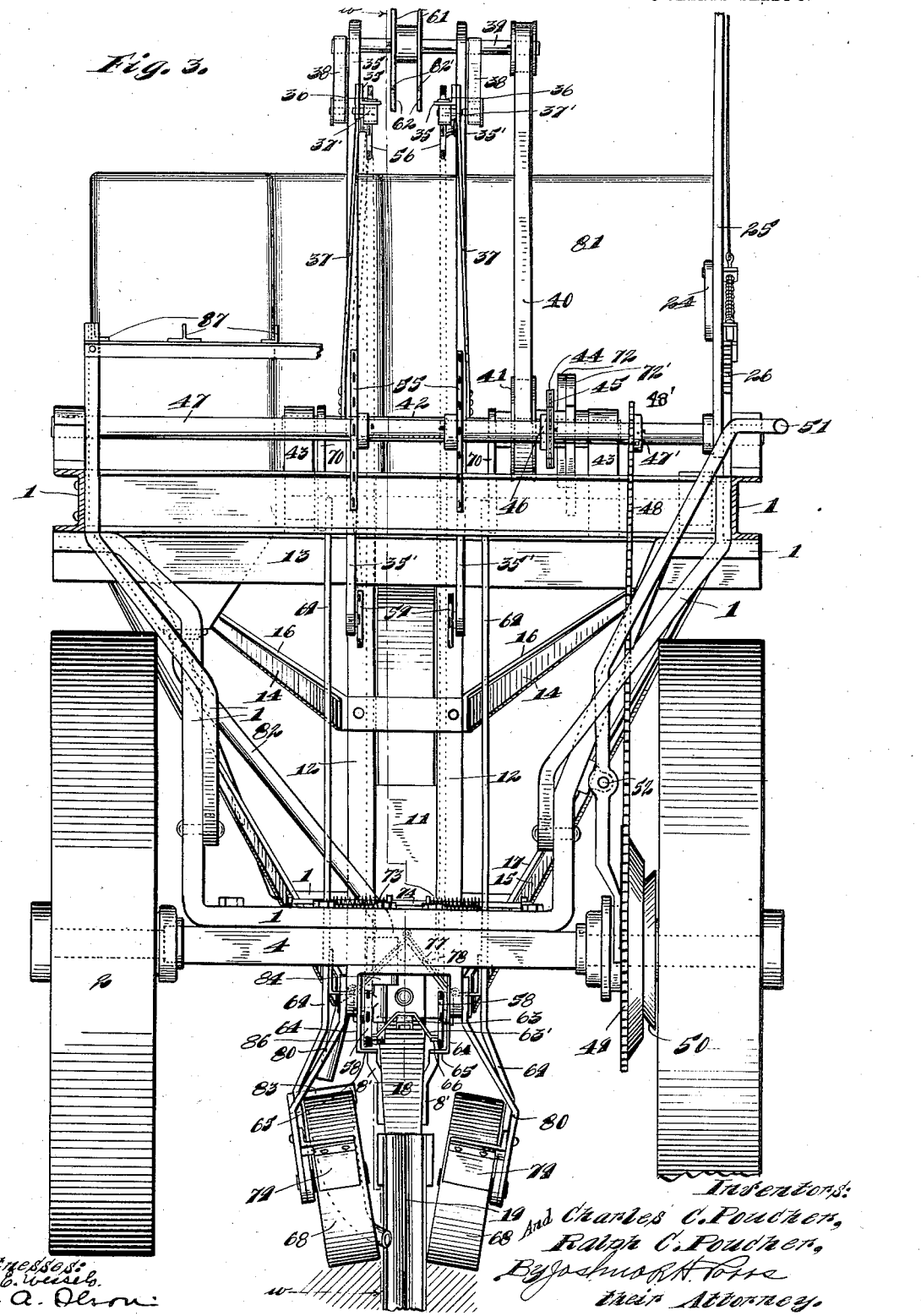

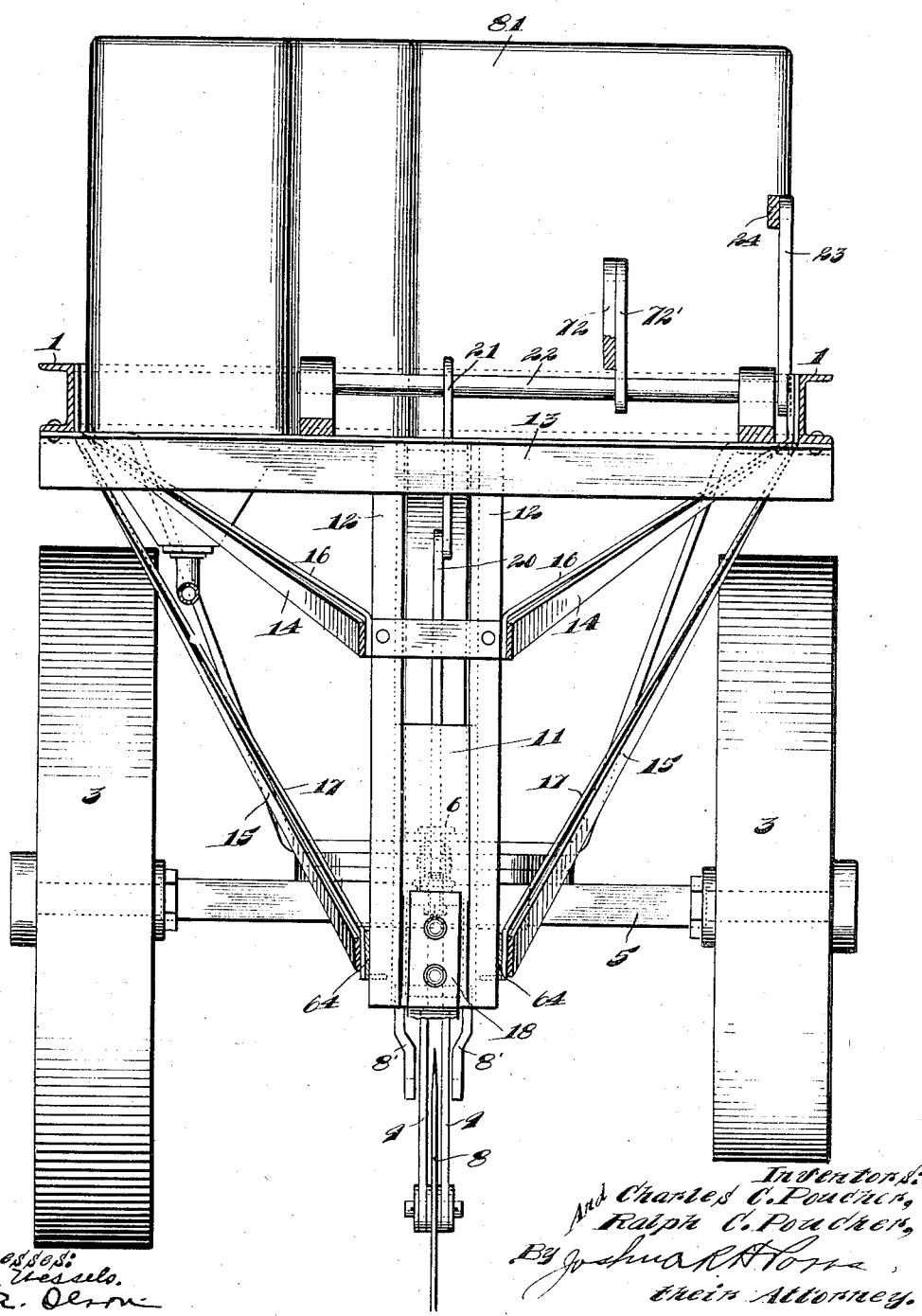

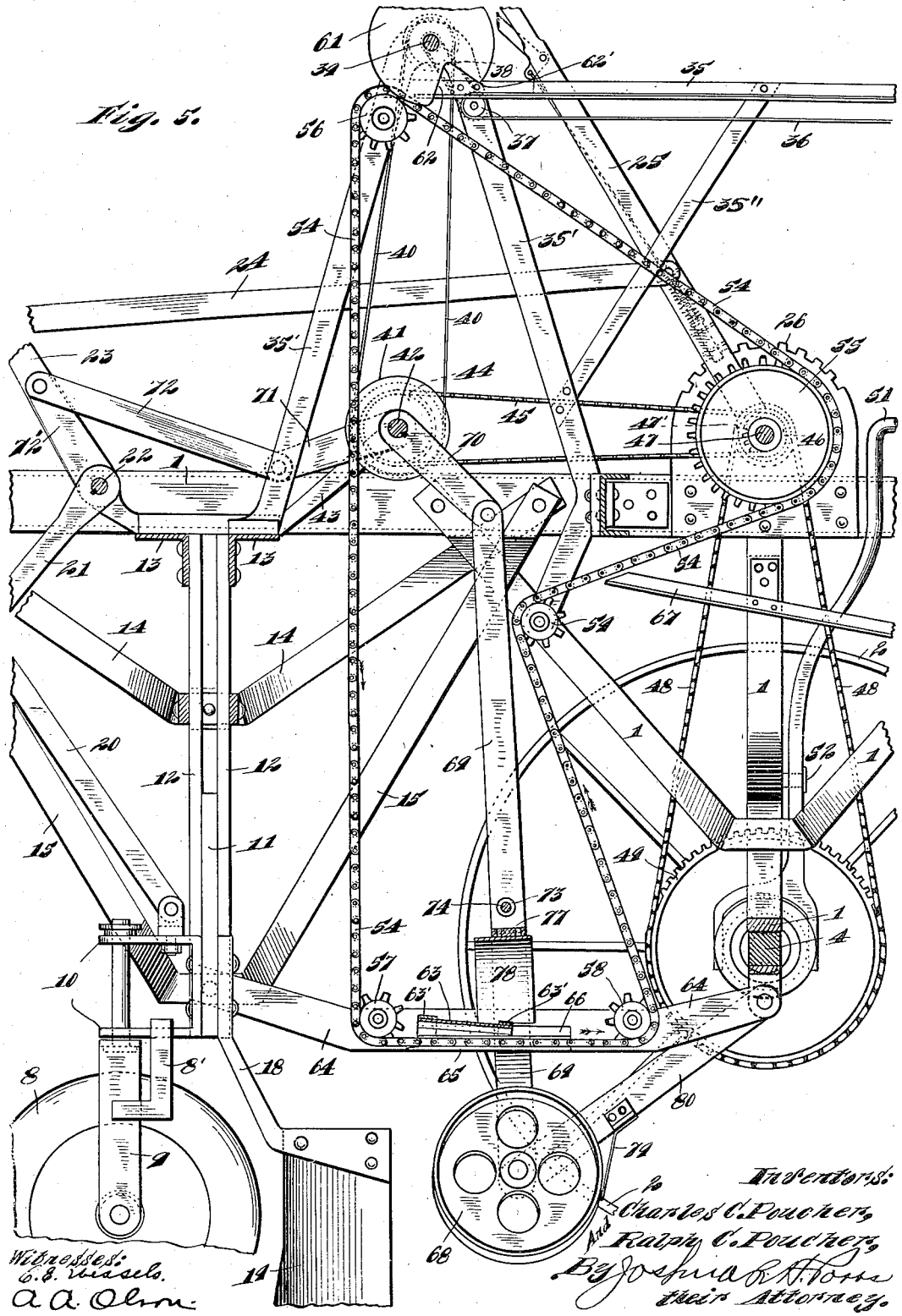

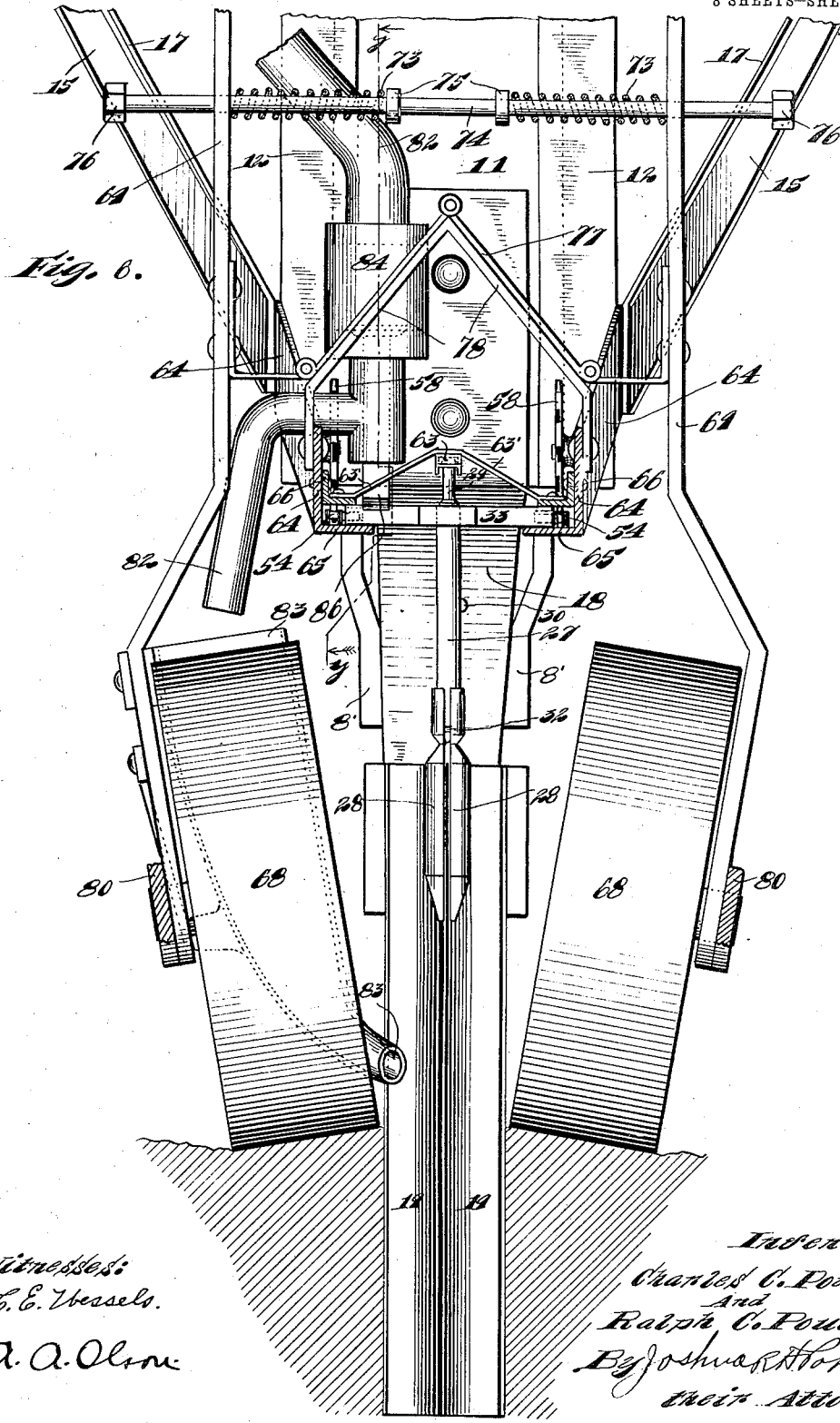

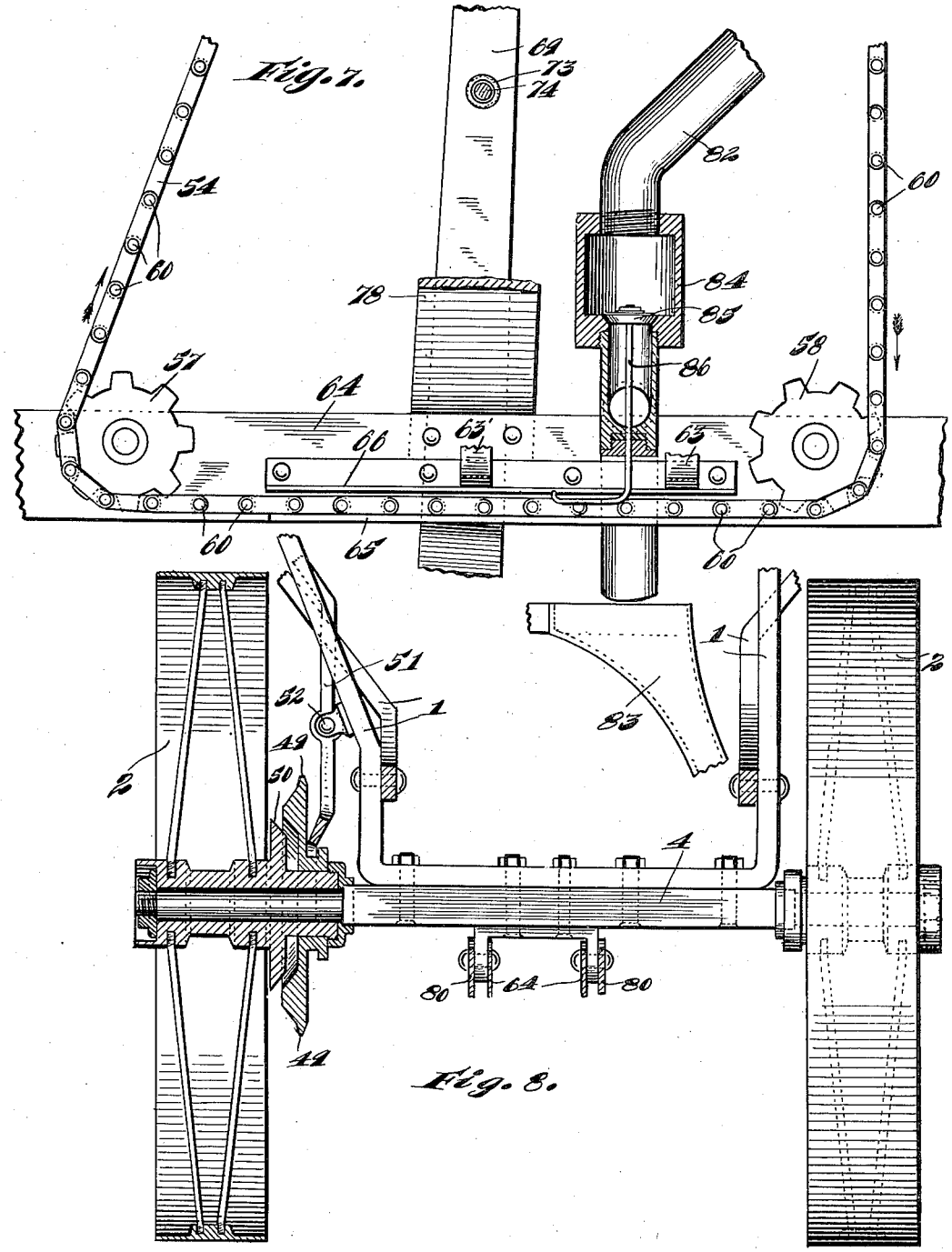

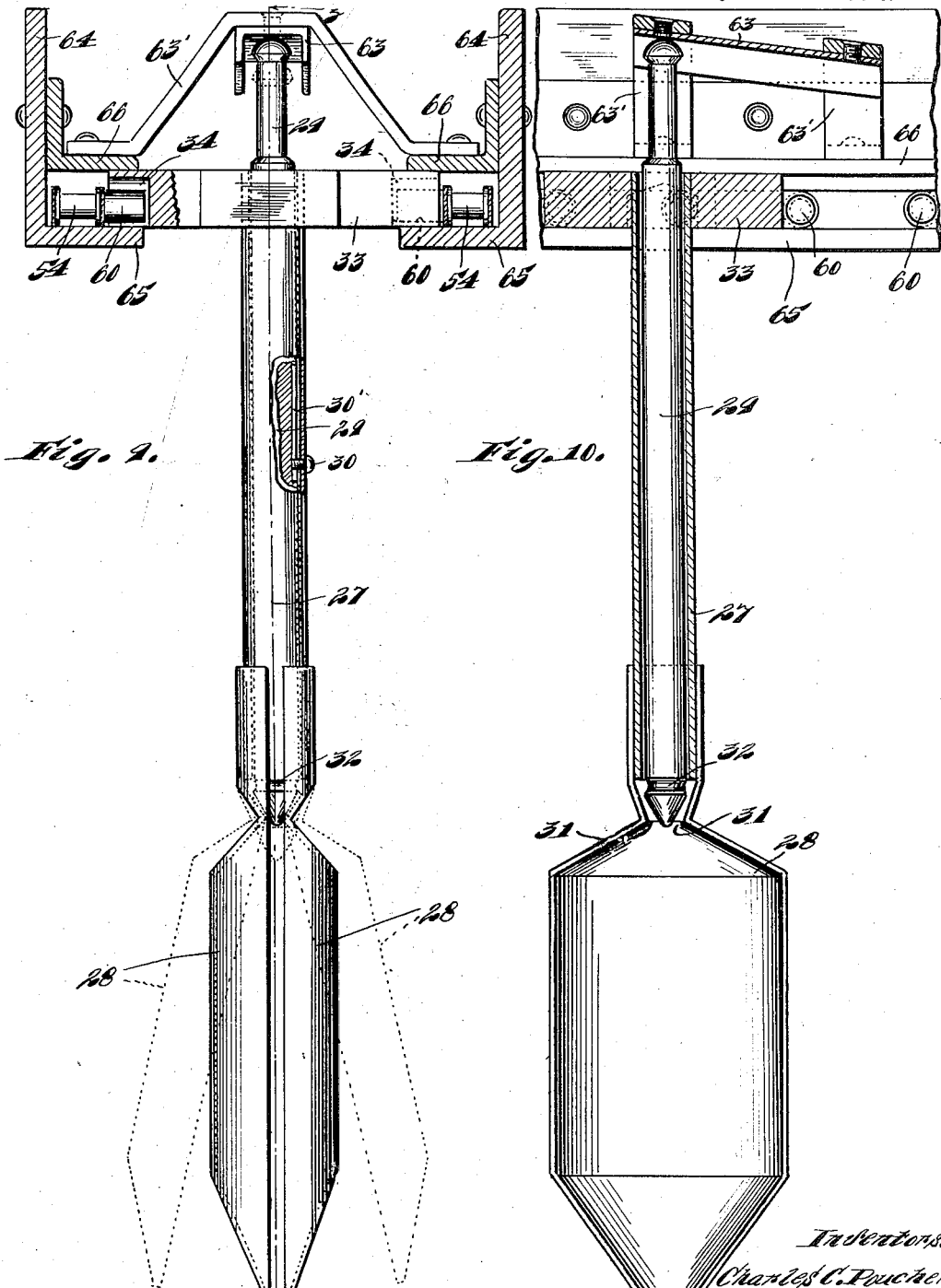

UNITED STATES PATENT OFFICE.

CHARLES C. POUCHER AND RALPH C. POUCHER, OF AURORA, ILLINOIS.

PLANT-REPLANTER.

1,106,405.   Specification of Letters Patent.   Patented Aug. 11, 1914.

Application filed May 31, 1913. Serial No. 771,050.

*To all whom it may concern:*

Be it known that we, CHARLES C. POUCHER and RALPH C. POUCHER, citizens of the United States, and residents of the city of Aurora, county of Kane, and State of Illinois, have invented certain new and useful Improvements in Plant-Replanters, of which the following is a specification.

Our invention relates to plant replanting devices that is to machines designed for use in the replanting of sprouts such as of cabbage and plants of this character which require replanting after the sprouting of the seeds in order to space the same apart.

At the present time the replanting of plants or sprouts of the character mentioned is manually effected, the work in this operation being arduous and tedious.

The object of our invention is the production of a machine through the medium of which the replanting of plants as mentioned may be mechanically effected with ease and expedition.

A further object is the production of a machine which will be of durable and economical construction and efficient in operation.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a replanting machine embodying our invention, Fig. 2 is a top plan view thereof, Fig. 3 is an enlarged vertical transverse section taken on substantially line $u$—$u$ of Fig. 1, Fig. 4 is an enlarged vertical transverse section taken on substantially line $v$—$v$ of Fig. 1, Fig. 5 is an enlarged central vertical section taken on substantially line $w$—$w$ of Fig. 3, Fig. 6 is an enlarged vertical transverse section taken on substantially line $x$—$x$ of Fig. 1, Fig. 7 is an enlarged detail vertical longitudinal section taken on substantially line $y$—$y$ of Fig. 6, Fig. 8 is an enlarged rear view of the rear axle and wheels of the machine, shown partly in section, Fig. 9 is an enlarged sectional front elevation of one of the plant carriers, showing the same supported in the guides provided at the lower portion of the machine, and Fig. 10 is a central section taken on substantially line $z$—$z$ of Fig. 9.

The preferred form of construction as illustrated in the drawings comprises a supporting frame or body 1 which is suitably mounted upon traction wheels 2 and 3, said wheels being mounted upon axles 4 and 5. The front axle 5 is mounted for oscillatory movement about a center 6 in order to permit of steerage or turning, and suitable draft mechanism 7 is provided for connection with a horse or horses in drawing the machine over the ground.

Arranged at the under side of the frame 1 substantially midway the extremities thereof is a vertically disposed colter 8 which is mounted in a fork 9 the upper end of which is mounted in bearings constituted by the respective ends of a U-shaped member 10 which is secured rigidly to the lower end of a plate 11. Said plate 11 is mounted for vertical sliding or reciprocation in guide channels 12 which engage the respective longitudinal edges of said plate, as clearly shown in Figs. 3, 4 and 5, the upper ends of said channel members being rigidly secured to transversely extending angle irons 13 secured rigidly to the frame 1, as clearly shown in Figs. 1 and 4. Angular fingers 8' depend from the bearing 10 for engagement with the opposite sides of the colter 8 to prevent oscillatory movement thereof beyond a limited extent, the members 8' thus serving to hold said colter in operative position. Brace members 14, 15, 16, and 17 coöperate with the channels 12 to hold the latter absolutely rigid, special precautions being taken to support said channel members since, in the operation of the machine, said channels are subjected to considerable strain.

Secured to and depending from the lower end of the plate 11 is an arm 18 to the lower end of which is secured a furrower 19. Said furrower is formed simply of a single piece of metal V-shaped in cross or horizontal section, which is arranged directly behind the colter 8, the arrangement being such, that in the operation of the machine, when said colter and furrower are in operative position, the same will serve to cut a furrow in the ground of a width and depth sufficient to receive the plants which it is desired to replant. The colter and furrower are connected, as will be observed, with the same element 11 and so that movement of said colter and furrower into and out of operative relation with the ground is simultaneously effected by vertical movement of said member 11. Such movement of said member 11 is obtained through a link 20 which is connected at its lower end to the bearing member 10, as shown in Fig. 1, the upper end of said link being connected with the outer end of a rocker arm 21 secured to a rocker shaft 22 mounted in the frame 1. Upon the shaft 22 is also provided a rocker arm 23, the outer end of said rocker arm being connected by means of a link 24 with an oscillatory hand operable lever 25 which is mounted adjacent the rearward end of the frame 1. The lever 25 is provided with the conventional spring pressed pawl mechanism and the coöperating notched segmental plate 26 for releasably locking said lever and hence the colter and furrower in positions of adjustment.

The plants to be replanted are carried by carriers of a construction shown in Figs. 9 and 10. As thereshown each carrier comprises an elongated tubular body 27 to the lower end of which is provided a pair of jaw members 28 adapted normally to embrace the upper end portion or leaves and stalk of a plant or sprout, the roots of the plant or sprout projecting from the lower ends of said jaws. Slidably mounted in the body 27 is a plunger 29 which is held against rotary movement by a screw 30 secured in the body 27 which engages an elongated slot 30′ provided in one side of said plunger. The lower end of said plunger is conically formed for engagement with the contracted portions or neck 31 in order to spring the jaws 28 outwardly to releasing positions, as shown in dotted lines in Fig. 9. The jaw members 28 are so arranged that in moving to releasing position, the same move laterally or transversely of the direction in which the machine is moving. At the upper end of the conical extremity of the plunger 29 is provided a circumferential groove 32 with which the portions or edges 31 of the jaw members 28 engage to hold the latter in releasing positions, said jaw members returning to operative or embracing positions only upon retraction or upward movement of said plunger. At the upper end of the body 27 is provided a head 33 provided at its opposite sides with laterally and downwardly opening sockets or recesses 34.

In using the device, a plurality of plant carriers are employed, said carriers, after the arrangement of a plant in each thereof, being arranged upon a support provided at the upper side of the machine which is constituted by horizontally disposed spaced angle irons 35, as clearly shown in Figs. 1, 3 and 5 which are supported by supporting frame work 35′ and 35″. In the arrangement of the plant carriers between the supporting members 35 the respective ends of the heads 33 of said carriers rest loosely upon the inwardly extending portions or flanges of said supporting members, the latter being spaced apart sufficiently to snugly receive said carrier heads between the same. Coöperating with the supporting members 35 are endless belts 36 traveling around rollers 37 and 37′. The upper sides of the belts 36 travel upon the upper surfaces of the inwardly extending flanges or supporting portions of said supporting members, serving, when said belts are in motion, to convey the plant carriers forwardly, as will be readily understood.

The belts 36 are driven through the medium of belts 38 which establish on operative connection between the rollers 37 and a shaft 39 which is mounted in bearings provided in the upper end of the supporting member 35′. The shaft 39 is driven by a belt 40 which passes around a channel pulley provided upon said shaft and also a similar pulley 41 loosely mounted upon a shaft 42 mounted in bearings 43. Formed integral or rigidly connected with the pulley 41 is a sprocket wheel 44 around which travels a sprocket chain 45 which passes around a sprocket wheel 46 secured to a shaft 47 mounted in suitable bearings 47′. The shaft 47 is driven by means of a sprocket chain 48 which engages a sprocket wheel 48′ provided upon said shaft, and a sprocket wheel 49 which is loosely and slidably mounted upon an extension of the hub of one of the rear wheels 2, as clearly shown in Fig. 8. The sprocket wheel 49 is recessed at one side, as shown to constitute the female member of a friction clutch, said female member being adapted to coöperate with a male clutch member 50 formed upon said wheel hub in order to effect an operative driving connection between said wheel and the train of movable mechanism above described. The sprocket wheel 49 is moved into and out of operative relation with the clutch member 50 by means of a suitable shiftable fork 51 which is fulcrumed at 52, the rearward upper end of said shifting fork terminating in operative proximity with a driver's seat 53 arranged at the rearward end of the machine as shown. With this arrangement, it will be seen that the driving of the planting mechanism is from the rear wheels of the machine, and that connection of the mechanism for driving by the rear wheels of the mechanism or disconnection of said mechanism therefrom may be effected by simply oscillating the shifting fork 51.

The plant carriers supported upon the members 35 are fed forwardly, as above described, by the belts 36, said carriers being transferred from the forward ends of said supporting members to endless conveyer chains 54 which are mounted for travel around sprocket wheels 55, 56, 57, 58 and 59, there being two chains 54 which are spaced apart in order to accommodate the carriers between the same. The sprocket wheels 55 are fixed to the shaft 47, an operative connection being thus established whereby the chains 54 will be driven from the same source as the other mechanism heretofore described. The chains 54 are provided at the joints of the links thereof with inwardly projecting studs or lugs 60 adapted for engagement with the sockets 34 provided at the respective ends of the heads 33 of the carriers, as clearly shown in Fig. 9, said carriers being thus loosely suspended by said lugs which only loosely engage said sockets.

The transfer of the carriers from the forward ends of the supporting members 35 to the conveyer chains 54 is effected by a pair of circular plates or disks 61 which are rigidly secured centrally to the shaft 39. The plates 61 are provided in their peripheries with notches 62, as clearly shown in Fig. 5, adapted for the reception of the opposite ends of the heads 33, or in other words said members 61 are adapted normally, to prevent the passage of the carriers from the supporting members 35, the heads 33 of said carriers abutting the peripheries of said plates, the discharge or transfer of a carrier from said supporting members to the chains 54 being effected only when the notches 62 register with the head 33 of the foremost carrier, said notches accommodating the respective ends of the foremost carrier moving the same forward into engagement with the lugs or studs 60 of the chains 54 which happen at that time to be in registration with the forward ends of the members 35. In this transfer of the carriers from the supporting members 35 to the chains 54, the corners 62' of the plates 61 at the notches 62 will, upon rotation of said plates, just register with the adjacent surfaces of the heads of the two foremost carriers and thus serve to select the foremost carrier and at the same time retard the advance of the next carrier. With this arrangement then, it will be seen that a plant carrier will be transferred from the supporting members 35 to the conveyer chains 54 upon each complete rotation of the plates 61, the latter thus serving as a means for spacing the carriers upon said chain, and consequently of ultimately spacing the plants in the ground. This being so, the spacing of the carriers upon the conveyer chains and hence of the plants in the ground may be varied by simply regulating or adjusting the speed of rotation of the plates 61, this being effected by changing the pulley around which the belt 40 travels.

The plant carriers transferred from the supporting members 35 to the chains 54 are conveyed first downwardly by the latter until the same reach the sprocket wheels 57 when said carriers will be conveyed rearwardly in a horizontal plane toward the sprocket wheels 58. In the passage of each carrier between the sprocket wheels 57 and 58 the upper end of the plunger 29 thereof will contact with an inclined channel cam member 63, the latter serving to depress said plunger in order to move the jaws 28 to releasing positions and discharge the plant. In order to reinforce or support the chains 54 at this point bars 64 are provided secured rigidly in position at their respective ends by connection with the guide channels 12 and the rear axle of the machine. The bars 64 are provided at their lower edges with inwardly turned flanges 65 and secured to the inner sides of said bars are inwardly extending flanges 66. As clearly shown in Figs. 9 and 10 channels are thus formed for the guidance of the chains 54 serving to support the same during actuation of the carriers to releasing positions. The cam member 63 is supported in operative position by supporting straps 63' which are secured rigidly to the flanges 66 as shown. The arrangement is such, as will be understood, that the plants which are carried by the carriers will be conveyed thereby into the furrow which is formed by the colter 8 and furrower 19, release of the plants being effected when the roots thereof are properly positioned in the furrow. After the plants have been released from the carriers, the latter will be conveyed upwardly after passing the sprocket wheel 58 toward the sprocket wheel 59. The sprocket wheels 59 are spaced slightly farther apart than the sprocket wheels 58 and the sprocket wheels 55 are spaced a little farther apart than the sprocket wheels 59, the arrangement being such that the chains will diverge from the sprocket wheels 58 toward the sprocket wheels 55, the divergence of said chains as the same approach the sprocket wheels 55 being sufficient to effect release of the carriers from the inwardly projecting studs or said chains. Hence as the plant carriers approach the sprocket wheels 55 the same will be automatically released therefrom and will drop into engagement with supporting members 67 arranged below said chains, as clearly shown in Figs. 1, 2 and 5. Said supporting bars 67 are inclined rearwardly so that as the carriers are deposited thereon the same will slide rearwardly by gravity to a position for ready engagement by the operator positioned in the seat 53. The rearward ends of said supporting members 67 are turned upwardly as shown in order to prevent sliding of the carriers to disengagement.

Simultaneously with the release of the plant from the carrier the sides of the furrow will be pressed into engagement with the roots thereof in order to complete the planting operation by means of outwardly inclined trucks 68 which are mounted at the lower ends of substantially vertically disposed arms 69, as clearly shown in Figs. 5 and 6. The upper ends of the arms 69 are connected with rocker arms 70 fixed to the shaft 42. The shaft 42 is also provided with a rocker arm 71 which is connected by means of a link 72 with a rocker arm 72′ fixed to the shaft 22. The arrangement is such, that rocking of the arms 70 in order to effect vertical adjustment of the arms 69 will be effected by the manually operative lever 25 simultaneously with the adjustment of the colter 8 and furrower 19. The arms 69 are adapted for slight lateral rocking or tilting, the same being normally held at their outer terminals of tilting or rocking by means of helical compression springs 73 mounted upon a bar 74, whose ends are loosely mounted in the arms 69, as clearly shown in Fig. 6, said springs being interposed between said arms and stops 75 arranged upon the bar 74. The bar 74 is provided at its respective ends with heads 76 which serve as stops which limit the outward rocking of the arms 69. Also connecting the lower ends of the arms 69 is a hinge member or split link 77. Cooperating with the link 77 is an inverted V-shaped or angular member 78 which is secured rigidly to the bars 64 projecting upwardly therefrom. The member 78 is so positioned that, in the downward movement of the arms 69, such as is caused upon downward rocking of the arms 70, the hinge member or split link 77 will contact with the former which will cause breaking of the joint in said hinge or link and thereby effect inward rocking of the lower ends of arms 69, as clearly shown in Fig. 6. The arrangement is such that the trucks 68 will be in operative position only when said arms 69 are at their inner terminal of oscillation and lower terminal of vertical movement, said trucks, upon elevation of said arms, being carried to inoperative position or out of contact with the ground. Cleaner blades 79 cooperate with the trucks 68 to remove soil which might adhere thereto in the operation of the machine, said blades being secured to reinforcing links 80 which connect the lower ends of the arms 69 with the rear axle 4 serving to brace the same.

Mounted at the front end of the frame 1 is a water tank 81 provided as shown with a filling plug at its front end. Leading from the under side of the tank 81 is a drain pipe 82 the lower end of which is adapted for registration with the upper end of a nozzle 83 carried by one of the arms 69 when the latter is in operative position. The lower end of the nozzle 83 is so positioned that the water discharged therefrom will be directed centrally into the furrow or toward the roots of the plants delivered to the furrow. The nozzle 83 is positioned to one side, as shown in order to afford clearance for the plants. Interposed in the pipe 82 is a valve for controlling the flow of water therethrough, said valve comprising a casing 84 and an ordinary puppet valve 85 provided with a depending stem 86. The valve 85 remains normally in closed position preventing the flow of water from the pipe 82, opening of the passage through said pipe being effected only upon upward movement of said valve stem. The lower end of the valve stem 86 is horizontally disposed and positioned for engagement with the heads 33 of the plant carriers. Said heads in the passage of the carriers between the sprocket wheels 57 and 58 will contact with said stem and cause elevation of the valve 85 to open position. Thus with this arrangement it will be seen that water will be discharged into the furrow only upon the positioning of a plant therein, and that each plant will be supplied with a sufficient amount of water to thoroughly moisten the roots thereof.

Provided at the rearward end of the frame 1 at each side of the seat 53 is a frame 87 upon which tables or trays may be arranged to accommodate the plants before arrangement thereof in the carriers for replanting. The tables or trays thus arranged will be positioned in close proximity with the seat so that the driver or operator may readily and easily reach the same in the filling of the carriers preparatory to the arrangement of the latter upon the supporting members 35.

The operation of the machine is simple and need not be attended by a skilled workman. The operator in operating the same first throws the lever 25 forwardly to effect lowering of the colter 8 and furrower 19 to operative position and to move the trucks 68 to engagement with the ground. This being done, the lever 51 is rocked in order to shift the sprocket wheel 49 into operative position to effect the operative connection of the mechanism with the driving rear wheel 2. After this is done it is only necessary to fill the plant carriers, that is to insert the upper end or leaves and stalk of a plant into each one of the carriers between the jaw portions 28 thereof, and to position the carriers thus filled upon the supporting members 35. The carriers arranged upon said supporting members will be carried forwardly by the belts 36 and transferred one at a time by means of the plates 61 to the conveyer belts 54. The latter will first convey the carriers downwardly until the roots of the plants arranged in the carriers are positioned in the furrow cut by the colter 8 and furrower 19. The carriers will then be successively actuated by means of the cam member 63 to release the plants, the roots of the latter at this time being supplied with water discharged from the nozzle 83.

the soil being packed around the same by the trucks 68 which engage the ground at each side of the furrow pressing the same inwardly to close the furrow. The travel of the conveyer chain 54 is so timed that the carriers after passing the sprocket wheels 57 will be conveyed rearwardly at a rate of speed equal to the rate of speed at which the device is moving forwardly and so that after a carrier has passed the rollers 57, the same and hence the plant carried thereby will be stationary relative to the ground. Such timing is essential in order to prevent tearing of the roots from the upper end of the plant, it being clear that without such timing the roots would be dragged along the ground through the furrow and injured if not severed from the upper ends of the plants. After passing the sprocket wheels 58 the carriers will be elevated toward the sprocket wheels 59 and 55, said carriers being released from said chains by reason of the divergence of the latter as before described, as the same approach the sprocket wheels 55, the carriers thus released dropping to engagement with the supporting member 67 where the same may be reached by the operator or driver for repeated use.

Thus, it will be seen, that the planting is entirely automatic and mechanically effected, the arrangement being such that the planting may be effected expeditiously and with little help on the part of the driver or operator stationed in the seat 53.

While we have illustrated and described the preferred form of construction for carrying our invention into effect, this is capable of variation and modification without departing from the spirit of the invention. We, therefore, do not wish to limit ourselves to the precise details of construction set forth, but desire to avail ourselves of such variations and modifications as come within the scope of the appended claims.

Having described our invention what we claim as new and desire to secure by Letters Patent is:

1. In a plant replanter, the combination of a furrower; a plant carrier adapted to releasably suspend a plant for replanting; a support for said carrier; means for conveying said carrier from said support to the furrow cut by said furrower; means for automatically transferring said carrier from said support to said conveying means; means for actuating said carrier to release the plant carried thereby when said plant is positioned with its roots projecting into the furrow; and means for pressing the soil about the root of the plant when placed in the furrow, substantially as described.

2. In a plant replanter, the combination of a furrower; a plant carrier adapted to releasably suspend a plant for replanting; a support for said carrier; means for conveying said carrier from said support to the furrow cut by said furrower; means for automatically transferring said carrier from said support to said conveying means; means for introducing water into the furrow upon the insertion of a plant root therein; means for actuating said carrier to release the plant carried thereby when said plant is positioned with its roots projecting into the furrow; and means for pressing the soil about the roots of the plant when positioned in the furrow, substantially as described.

3. In a plant replanter, the combination of a colter; a furrower arranged behind said colter; a plant carrier adapted to releasably suspend a plant for replanting; a support for said carrier; means for conveying said carrier from said support to the furrow cut by said furrower; means for automatically transferring said carrier from said support to said conveying means; means for actuating said carrier to release the plant carried thereby when said plant is positioned with its roots projecting into the furrow; and means for pressing the soil about the root of the plant when positioned in the furrow, substantially as described.

4. In a plant replanter, the combination of a furrower; a plurality of plant carriers adapted to releasably suspend plants for replanting; means for conveying said carriers from said support to the furrow cut by said furrower; means for independently selecting the carriers supported by said support and automatically transferring the same from said support to said conveying means; means for actuating each of said carriers to release the plant carried thereby when said plant is positioned with its roots projecting into the furrow; and means for pressing the soil about the root of the plant when positioned in the furrow, substantially as described.

5. In a plant replanter, the combination of a vertically adjustable colter; a vertically adjustable furrower arranged behind said colter; a plant carrier adapted to releasably suspend a plant for replanting; a support for said carrier; means for conveying said carrier from said support to the furrow cut by said furrower; means for actuating said carrier to release the plant carried thereby when said plant is positioned with its roots projecting into the furrow; and vertically adjustable means for pressing the soil about the root of the plant when positioned in the furrow, substantially as described.

6. In a plant replanter, the combination of a furrower; a plurality of plant carriers adapted to releasably suspend plants for replanting; an operator's seat; a support for said carriers positioned adjacent said seat; means for conveying said carriers from said support to the furrow cut by said furrower; means for actuating each of said carriers to release the plant carried thereby when said plant is positioned with its roots projecting into the furrow; means for pressing the soil about the root of the plant when positioned in the furrow; and a second support for said carriers located adjacent said operator's seat, said carrier conveyer being adapted to deposit the carriers conveyed thereby onto said second support after the discharge of the plants from said carriers, substantially as described.

7. In a plant replanter, the combination of a furrower; a plurality of plant carriers adapted to releasably suspend plants for replanting; an operator's seat; a support for said carriers positioned adjacent said seat; means for individually selecting the carriers supported by said support and conveying the same from said support to the furrow cut by said furrower; means for actuating each of said carriers to release the plant carried thereby when said plant is positioned with its roots projecting into the furrow; means for pressing the soil about the root of the plant when positioned in the furrow; and a second support for said carriers located adjacent said operator's seat, said carrier conveyer being adapted to deposit the carriers conveyed thereby onto said second support after the discharge of the plants from said carriers, substantially as described.

8. In a plant replanter, the combination of a furrower; a plurality of plant carriers adapted to releasably suspend plants for replanting; a support for said carriers; means for conveying said carriers from said support to the furrow cut by said furrower, said means comprising a pair of endless flexible elements adapted for engagement with the upper end portions of said carriers; means for actuating said carriers to release the plants carried thereby, when said plants are positioned with their roots projecting into the furrow; and means for pressing the soil about the root of the plant when positioned in the furrow, substantially as described.

9. In a plant replanter, the combination of a furrower; a plurality of plant carriers adapted to releasably suspend plants for replanting; two supports for said carriers; means for conveying said carriers from one of said supports to the furrow cut by said furrower and depositing the same upon the other of said supports; means for actuating said carriers during transit thereof to release the plants carried thereby, when said plants are positioned with their roots projecting into the furrow; and means for pressing the soil about the root of each plant when positioned in the furrow, substantially as described.

10. In a plant replanter, the combination of a furrower; a plurality of plant carriers adapted to releasably suspend plants for replanting; two supports for said carriers; means for conveying said carriers from one of said supports to the furrow cut by said furrower and depositing the same upon the other of said supports, said means comprising a pair of spaced endless elements between which the plant carriers are positioned when conveyed thereby, said endless elements diverging as the same approach said second support to effect disengagement of said carriers therefrom; means for actuating said carriers during transit thereof to release the plants carried thereby, when said plants are positioned with their roots projecting into the furrow; and means for pressing the soil about the root of each plant when positioned in the furrow, substantially as described.

11. In a plant replanter, the combination of a furrower; a plurality of plant carriers adapted to releasably suspend plants for replanting; two supports for said carriers; means for conveying said carriers from one of said supports to the furrow cut by said furrower and depositing the same upon the other of said supports, said means comprising a pair of spaced endless chains between which the plant carriers are positioned when conveyed by said chains, said endless chains diverging as the same approach said second support to effect disengagement of said carriers therefrom; means for actuating said carriers during transit thereof to release the plants carried thereby when said plants are positioned with their roots projecting into the furrow; and means for pressing the soil about the root of each plant when positioned in the furrow, substantially as described.

12. In a plant replanter, the combination of a furrower; a plurality of plant carriers adapted to releasably suspend plants for replanting; two supports for said carriers; means for conveying said carriers from one of said supports to the furrow cut by said furrower and depositing the same upon the other of said supports, said means comprising a pair of spaced endless elements between which the plant carriers are positioned when conveyed by said endless elements; laterally projecting lugs on said endless elements for engagement with laterally and downwardly opening sockets provided at the sides of said carriers, said endless elements diverging as the same approach said second support to effect disengagement of said carriers therefrom; means for actuating said carriers during transit thereof to release the plants carried thereby, when said plants are positioned with their roots projecting into the furrow; and means for pressing the soil about the root of each plant when positioned in the furrow, substantially as described.

13. In a plant replanter, the combination of a furrower; a plurality of plant carriers adapted to releasably suspend plants for replanting; a support for said carriers; means for conveying said carriers from said support to the furrow cut by said furrower; means for individually selecting said carriers to effect equal spacing thereof upon said conveying means; means for actuating said carriers to release the plants carried thereby, when said plants are positioned with their roots projecting into the furrow; and means for pressing the soil about the root of each plant when positioned in the furrow, substantially as described.

14. In a plant replanter, the combination of a furrower; a plurality of plant carriers adapted to releasably suspend plants for replanting; a support for said carriers; means for conveying said carriers from said support to the furrow cut by said furrower; means for individually selecting said carriers to effect equal spacing thereof upon said conveying means, said selecting means comprising a circular rotary member having a recess in its periphery adapted to receive the upper end portion of a carrier; means for actuating said carriers to release the plants carried thereby when said plants are positioned with their roots projecting into the furrow; and means for pressing the soil about the root of each plant when positioned in the furrow, substantially as described.

15. In a plant replanter, the combination of a furrower; a plurality of plant carriers adapted to releasably suspend plants for replanting; a support for said carriers; means for conveying said carriers from said support to the furrow cut by said furrower; means for feeding said carriers on said support toward said conveyer; means for individually selecting said carriers to effect equal spacing thereof upon said conveying means; means for actuating said carriers to release the plants carried thereby, when said plants are positioned with their roots projecting into the furrow; and means for pressing the soil about the root of each plant when positioned in the furrow, substantially as described.

16. In a plant replanter, the combination of a furrower; a plurality of plant carriers adapted to releasably suspend plants for replanting; a support for said carriers; means for conveying said carriers from said support to the furrow cut by said furrower, said means comprising a pair of spaced endless chains; inwardly projecting lugs spaced upon said chains adapted for engagement by laterally and downwardly opening sockets provided in the sides of said carriers; means for feeding said carriers on said support toward said conveyer; means for individually selecting said carriers to effect equal spacing thereof upon said endless chains; means for actuating said carriers to release the plants carried thereby, when said plants are positioned with their roots projecting into the furrow; and means for pressing the soil about the root of each plant when positioned in the furrow, substantially as described.

17. In a plant replanter, the combination with a wheeled frame, of a furrower; a plurality of plant carriers adapted to releasably suspend plants for replanting; a support for said carriers; means for conveying said carriers from said support to the furrow cut by said furrower, said means comprising a pair of spaced endless chains; inwardly projecting lugs spaced upon said chains adapted for engagement by laterally and downwardly opening sockets provided in the sides of said carriers; means for feeding said carriers on said support toward said conveyer; means for individually selecting said carriers to effect equal spacing thereof upon said endless chains; means for actuating said carriers to release the plants carried thereby, when said plants are positioned with their roots projecting into the furrow; means for pressing the soil about the root of each plant when positioned in the furrow; and, an operative connection between the wheels of said frame and said conveying chains, substantially as described.

18. In a plant replanter, the combination with a wheeled frame, of a furrower; a plurality of plant carriers adapted to releasably suspend plants for replanting; two supports for said carriers; means for conveying said carriers from one of said supports to the furrow cut by said furrower and depositing the same upon the other of said supports; means for actuating said carriers during transit thereof to release the plants carried thereby, when said plants are positioned with their roots projecting into the furrow; means for pressing the soil about the root of each plant when positioned in the furrow; and an operative connection between said conveying means and the wheels of said frame, substantially as described.

19. In a plant replanter, the combination with a wheeled frame, of a furrower; a plurality of plant carriers adapted to releasably suspend plants for replanting; two supports for said carriers; means for conveying said carriers from one of said supports to the furrow cut by said furrower and depositing the same upon the other of said supports; means for actuating said carriers during transit thereof to release the plants carried thereby, when said plants are positioned with their roots projecting into the furrow; means for pressing the soil about the root of each plant when positioned in the furrow; and an operative connection between said conveying means and the wheels of said frame, whereby said conveying means at the place of release of the plants from said carriers, will convey said conveyers rearwardly at a rate of speed equal substantially to the rate of speed at which said frame is traveling forwardly, substantially as described.

20. In a plant replanter, the combination with a wheeled frame, of a furrower; a plurality of plant carriers adapted to releasably suspend plants for replanting; a support for said carriers; means for conveying said carriers from said support to the furrow cut by said furrower; means for actuating said carriers during transit thereof to release the plants carried thereby, when said plants are positioned with their roots projecting into the furrow; means for pressing the soil about the root of each plant when positioned in the furrow; and an operative connection between said conveying means and the wheels of said frame whereby, said conveying means, at the place of the release of the plants from said carriers, will convey said carriers rearwardly at a rate of speed equal substantially to the rate of speed at which said frame is traveling forwardly, substantially as described.

21. In a plant replanter, the combination of a furrower; a plant carrier adapted to releasably suspend a plant for replanting; a support for said carrier; means for conveying said carrier from said support to the furrow cut by said furrower; means for actuating said carrier to release the plant carried thereby when said plant is positioned with its roots projecting into the furrow; means for pressing the soil about the root of the plant when positioned in the furrow, said last mentioned means comprising a pair of trucks adapted to engage the ground at each side of the furrow and press the same inwardly; a pair of tiltably mounted arms carrying said trucks; and manually operable means for effecting tilting of said arms to move said trucks into or out of operative positions, substantially as described.

22. In a plant replanter, the combination of a furrower; a plant carrier adapted to releasably suspend a plant for replanting; a support for said carrier; means for conveying said carrier from said support to the furrow cut by said furrower; means for actuating said carrier to release the plant carried thereby when said plant is positioned with its roots projecting into the furrow; means for pressing the soil about the root of the plant when positioned in the furrow, said last mentioned means comprising a pair of trucks adapted to engage the ground at each side of the furrow and press the same inwardly; a pair of laterally tiltable, vertically adjustable arms carrying said trucks, said trucks being in operative positions when the lower ends of said arms are at their inner terminals of oscillation; means adapted when said arms are elevated to rock the lower ends thereof outwardly; and means adapted when said arms are lowered to rock the lower ends thereof inwardly, substantially as described.

23. In a plant replanter, the combination of a wheeled frame; a furrower mounted for vertical adjustment; a vertically adjustable colter arranged forward of said furrower; a plant carrier adapted to releasably suspend a plant for replanting; a support for said carrier; means for conveying said carrier from said support to the furrow cut by said furrower; means for actuating said carrier to release the plant carried thereby when said plant is positioned with its roots projecting into the furrow; means for pressing the soil about the root of the plant when positioned in the furrow, said last mentioned means comprising a pair of trucks adapted to engage the ground at each side of the furrow and press the same inwardly; a pair of laterally tiltable, vertically adjustable arms carrying said trucks, said trucks being in operative position when the lower ends of said arms are at their inner terminals of oscillation; means adapted when said arms are elevated to rock the lower ends thereof outwardly; means adapted when said arms are lowered to rock the lower ends thereof inwardly; and manually operable means for simultaneously actuating said furrower, colter and arms, substantially as described.

24. In a plant replanter, the combination of a furrower; a plurality of plant carriers adapted to releasably suspend the plants for replanting; a support for said carriers; means for conveying said carriers from said support to the furrow cut by said furrower; a water supply; means for conducting the water from said supply and introducing the same into said furrow; a valve controlling the discharge of said water; and means for intermittently operating said valve whereby water will be supplied to each plant root introduced into the furrow, substantially as described.

25. In a plant replanter, the combination of a furrower; a plant carrier adapted to releasably suspend a plant for replanting, said carrier comprising a body having an expansible lower end adapted normally to embrace the upper end of a plant; a support for said carrier; means for conveying said carrier from said support to the furrow cut by said furrower; and means for expanding said lower end of said carrier to release the plant carried thereby, when said plant is positioned with its roots projecting into the furrow, substantially as described.

26. In a plant replanter, the combination of a furrower; a plant carrier adapted to releasably suspend a plant for replanting, said carrier, comprising a body having an expansible lower end adapted normally to embrace the upper end of a plant; a support for said carrier; means for conveying said carrier from said support to the furrow cut by said furrower; a plunger mounted in said body for expanding the lower end thereof; and means for actuating said plunger to expand said end of said body and release the plant carried thereby, when said plant is positioned with its roots projecting into the furrow, substantially as described.

27. In a plant replanter, the combination of a furrower; a plant carrier adapted to releasably suspend a plant for replanting, said carrier comprising a body having a split laterally expansible lower end adapted to embrace the upper end of a plant; a support for said carrier; means for conveying said carrier from said support to the furrow cut by said furrower; and means for expanding said lower end of said carrier to release the plant carried thereby, when said plant is positioned with its roots projecting into the furrow, substantially as described.

In testimony whereof we have signed our names to this specification in the presence of two subscribing witnesses.

CHARLES C. POUCHER.
RALPH C. POUCHER.

Witnesses:
JOSHUA R. H. POTTS,
HELEN F. LILLIS.